US011119550B2

(12) United States Patent
Tseng et al.

(10) Patent No.: US 11,119,550 B2
(45) Date of Patent: Sep. 14, 2021

(54) USB DEVICE AND OPERATION METHOD THEREOF

(71) Applicant: Aten International Co., Ltd., New Taipei (TW)

(72) Inventors: Chun-Tang Tseng, New Taipei (TW); Wei-Lun Hsu, New Taipei (TW); Po-Wen Chen, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 16/819,202

(22) Filed: Mar. 16, 2020

(65) Prior Publication Data

US 2021/0109580 A1 Apr. 15, 2021

(30) Foreign Application Priority Data

Oct. 15, 2019 (TW) .................................. 108137083

(51) Int. Cl.
*G06F 1/26* (2006.01)
*H01H 47/00* (2006.01)
*G06F 13/42* (2006.01)
*H02J 7/00* (2006.01)

(52) U.S. Cl.
CPC .......... *G06F 1/263* (2013.01); *G06F 13/4282* (2013.01); *H01H 47/00* (2013.01); *G06F 2213/0042* (2013.01); *H02J 7/0045* (2013.01)

(58) Field of Classification Search
CPC ................. G06F 1/263; G06F 13/4282; G06F 2213/0042; H01H 47/00; H02J 7/0045
See application file for complete search history.

(56) References Cited

U.S. PATENT DOCUMENTS

| 7,028,126 B1* | 4/2006 | Liang ................... G06F 13/4068 710/301 |
| 9,755,449 B2 | 9/2017 | Nge et al. |
| 2012/0036294 A1* | 2/2012 | Lee ...................... G06F 13/4081 710/63 |
| 2014/0375143 A1 | 12/2014 | Bai et al. |

(Continued)

FOREIGN PATENT DOCUMENTS

| TW | 201617914 | 5/2016 | |
| TW | 633440 B1 * | 8/2018 | ............. G06F 13/38 |

(Continued)

OTHER PUBLICATIONS

"Office Action of Taiwan Counterpart Application", dated Oct. 13, 2020, p. 1-p. 7.

*Primary Examiner* — Jared Fureman
*Assistant Examiner* — Duc M Pham
(74) *Attorney, Agent, or Firm* — JCIPRNET

(57) ABSTRACT

A USB device and an operation method thereof are provided. The USB device includes a first switch, a second switch, a power converter, and a first USB connector. A first terminal of the first switch is configured to receive a first voltage. The power converter is configured to provide a second voltage, and the second voltage is less than the first voltage. A first terminal of the second switch is coupled to the power converter to receive the second voltage. A first power pin of the first USB connector is coupled to a second terminal of the first switch and a second terminal of the second switch.

14 Claims, 3 Drawing Sheets

(56) References Cited

U.S. PATENT DOCUMENTS

| | | | |
|---|---|---|---|
| 2015/0082056 A1* | 3/2015 | Hsieh | G06F 1/266 |
| | | | 713/300 |
| 2017/0336844 A1 | 11/2017 | Koga | |
| 2018/0212435 A1 | 7/2018 | Li | |

FOREIGN PATENT DOCUMENTS

| | | |
|---|---|---|
| TW | 201915766 | 4/2019 |
| TW | 201933129 | 8/2019 |

\* cited by examiner

USB DEVICE AND OPERATION METHOD THEREOF

CROSS-REFERENCE TO RELATED APPLICATION

This application claims the priority benefit of Taiwan application serial no. 108137083, filed on Oct. 15, 2019. The entirety of the above-mentioned patent application is hereby incorporated by reference herein and made a part of this specification.

BACKGROUND OF THE INVENTION

1. Field of the Invention

The invention relates to an electronic device, and more particularly to a universal serial bus (hereinafter referred to as "USB") device and an operation method thereof

2. Description of Related Art

In order to meet requirements of high-power transmission and two-way power supply, USB type-C has been gradually applied to various USB devices, such as a USB hub. Because a power delivery pass-through (PD pass-through) mode may allow a USB device to achieve optimal power usage efficiency, the USB hub usually uses a PD pass-through power profile to supply power to an external apparatus.

When the USB hub is applied to high power-consumption operations (for example, a USB hub simultaneously performs an image display operation of a first external apparatus (such as a mobile phone) and a data access operation of a second external apparatus (such as a flash drive)), if the USB hub uses an adapter as a power supply source, the adapter needs to supply high enough power (such as an output voltage of 9V and an output current of 3A) to the USB hub for maintaining normal operation of the USB hub. In this case, it is assumed that the USB hub is connected to a third external apparatus (for example, a notebook computer) with the PD pass-through mode. For safety consideration, during configuration channel (CC for short) communicating with the third external apparatus, the USB hub needs to supply power to the third external apparatus with low-voltage communication power. Because the power is supplied by the adapter to the third external apparatus via the PD pass-through mode, the USB hub will decrease output power of the adapter to communication power (for example, 5V, 3A). After the configuration channel communication ends, the USB hub will then increase the output voltage of the adapter to fulfill the power demands of the third external apparatus.

However, during the configuration channel communication, when the output voltage of the adapter is decreased from a high-voltage state (for example, 9V) to a low-voltage state (for example, 5V), the USB hub cannot obtain sufficient power to perform the high power-consumption operation, which then causes functions of the external apparatus to be interrupted. For example, when the first external apparatus (such as a mobile phone) is playing a video, if the third external apparatus (such as a notebook computer) is connected to the USB hub in the PD pass-through mode, a screen of the first external apparatus may flicker, or the video playback may be interrupted.

SUMMARY OF THE INVENTION

The invention provides a USB device and an operation method thereof, which can supply communication power to a first USB connector.

An embodiment of the invention provides a USB device. The USB device includes a first switch, a second switch, a power converter, and a first USB connector. A first terminal of the first switch is configured to receive a first voltage. The power converter is configured to provide a second voltage, and the second voltage is lower than the first voltage. A first terminal of the second switch is coupled to the power converter to receive the second voltage. A first power pin of the first USB connector is coupled to a second terminal of the first switch and a second terminal of the second switch.

Another embodiment of the invention provides an operation method of a USB device. The operation method of the USB device includes: receiving a first voltage by a first terminal of a first switch; providing a second voltage by a power converter, wherein the second voltage is lower than the first voltage; receiving the second voltage by a first terminal of a second switch; providing a first USB connector, wherein a first power pin of the first USB connector is coupled to a second terminal of the first switch and a second terminal of the second switch; and when the first USB connector is connected to an external apparatus, during a configuration detection period for the external apparatus, the first switch being turned off and the second switch being turned on.

Based on the above, in embodiments of the invention, in addition to providing a PD pass-through path to transmit a normal operating voltage to the first USB connector, the USB device may further provide a power bypass path to transmit communication power to the first USB connector. The USB device may provide the PD pass-through path or the power bypass path of the USB device by controlling the conducting states of the first switch and the second switch. Therefore, when the first USB connector of the USB device is connected to an external apparatus for configuration channel (CC for short) communication, the USB device may supply power to the external apparatus via the power bypass path. In this way, during a high power-consumption operation of the USB device, when the external apparatus is connected to a first USB hub in a PD pass-through mode, the USB device does not need to lower an output voltage of an adapter. Therefore, the USB device does not suffer from insufficient power supply due to reconnection to another external apparatus.

In order to make the aforementioned features and advantages of the invention comprehensible, embodiments accompanied with drawings are described in detail below.

DESCRIPTION OF THE EMBODIMENTS

Figure 1:
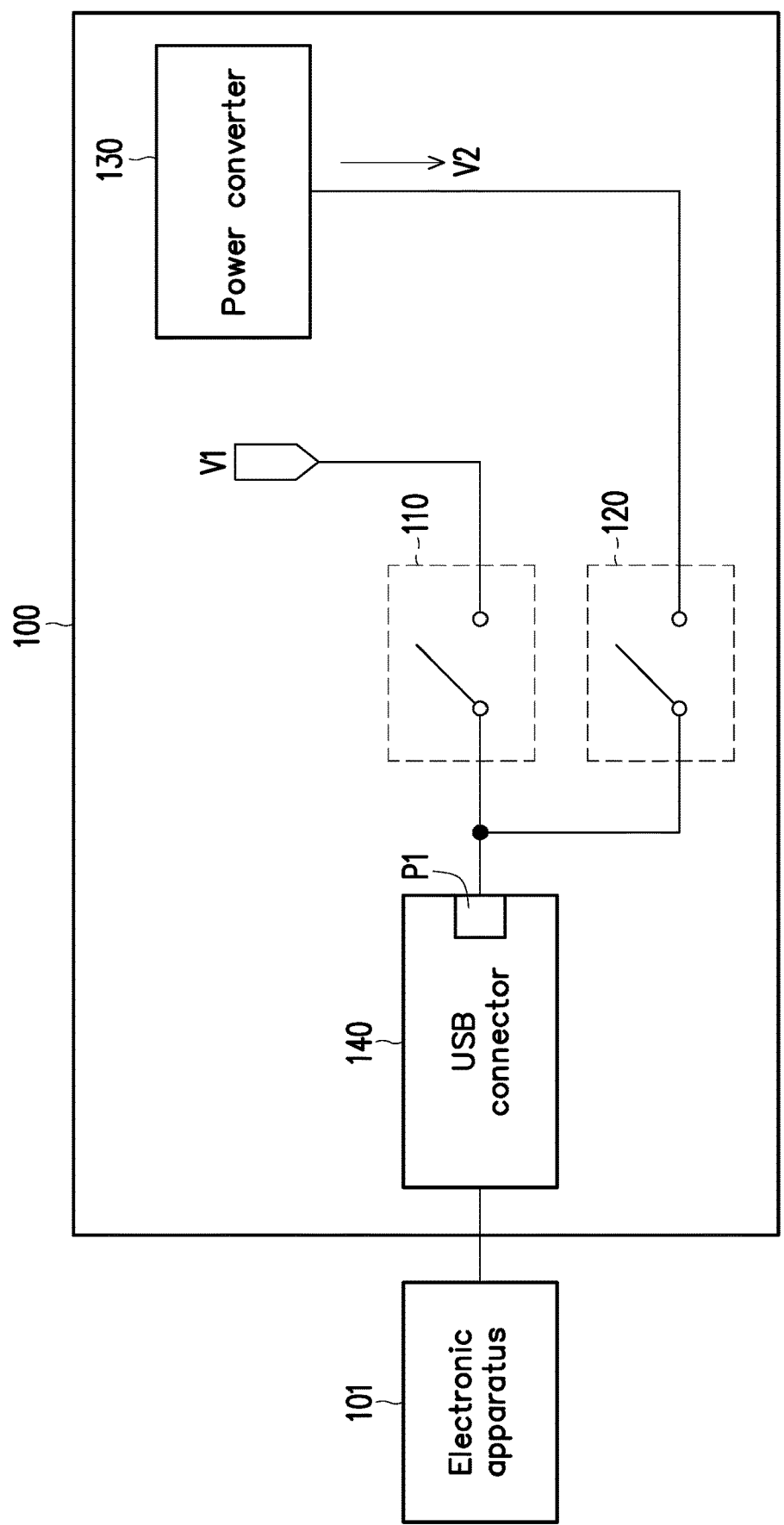
FIG. 1 is a schematic circuit block diagram of a USB device according to an embodiment of the invention.

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Wherever possible, the same reference numbers are used in the drawings and the description to refer to the same or like parts, components or steps.

FIG. 1 is a circuit block diagram of a USB device 100 according to an embodiment of the invention. As shown in FIG. 1, the USB device 100 includes a switch 110, a switch 120, a power converter 130, and a USB connector 140. The USB device 100 may be connected to an external apparatus (for example, an electronic apparatus 101) via the USB connector 140. According to design requirements, the USB connector 140 may be a USB type-C (also referred to as USB-C) connector or other USB connectors. Therefore, the USB device 100 may simultaneously perform a power delivery (PD) operations and a data transmission operation through the USB connector 140.

In the embodiment of FIG. 1, a first terminal of the switch 110 may receive a first voltage V1. According to design requirements, the first voltage V1 may be an output voltage provided by an adapter (not shown) to the switch 110 via a power delivery pass-through (PD pass-through) path of the USB device 100. A first terminal of the switch 120 is coupled to the power converter 130 to receive a second voltage V2 provided by the power converter 130. According to design requirements, the power converter 130 may be, for example, a conventional voltage converter or other voltage conversion circuit/element. The second voltage V2 provided by the power converter 130 is less than the first voltage V1. For example, the second voltage V2 may be a voltage that conforms to a standard specified for communication power of the USB protocol. A first power pin P1 of the first USB connector 140 is coupled to a second terminal of the switch 110 and a second terminal of the switch 120.

According to design requirements, the switch 110 and the switch 120 may be metal-oxide-semiconductor transistor switches or other power switches. The USB device 100 may control conducting states of the switch 110 and the switch 120, to provide a PD pass-through path or a power bypass path between the external apparatus and the USB device 100. For example, as shown in FIG. 1, the switch 120 may provide a power bypass path as a power supply path when the USB device 100 and the electronic apparatus 101 perform configuration channel (CC for short) communication. When the electronic device 101 is connected to the USB connector 140, the USB device 100 may turn on the switch 120 during the CC communication with the electronic apparatus 101, and turn off the switch 110, to provide the second voltage V2 to the electronic apparatus 101 via the power bypass path.

When the CC communication between the USB device 100 and the electronic device 101 comes to an end, the USB device 100 may turn on the switch 110 and turn off the switch 120, to provide the first voltage V1 to the electronic apparatus 101 via the PD pass-through path. The PD pass-through path may serve as a power supply path for the USB device 100 to charge the electronic apparatus 101. According to actual application requirements, the electronic apparatus 101 may be an electronic product such as a notebook computer, a tablet computer, a smart phone, or a mobile power source.

Figure 2:
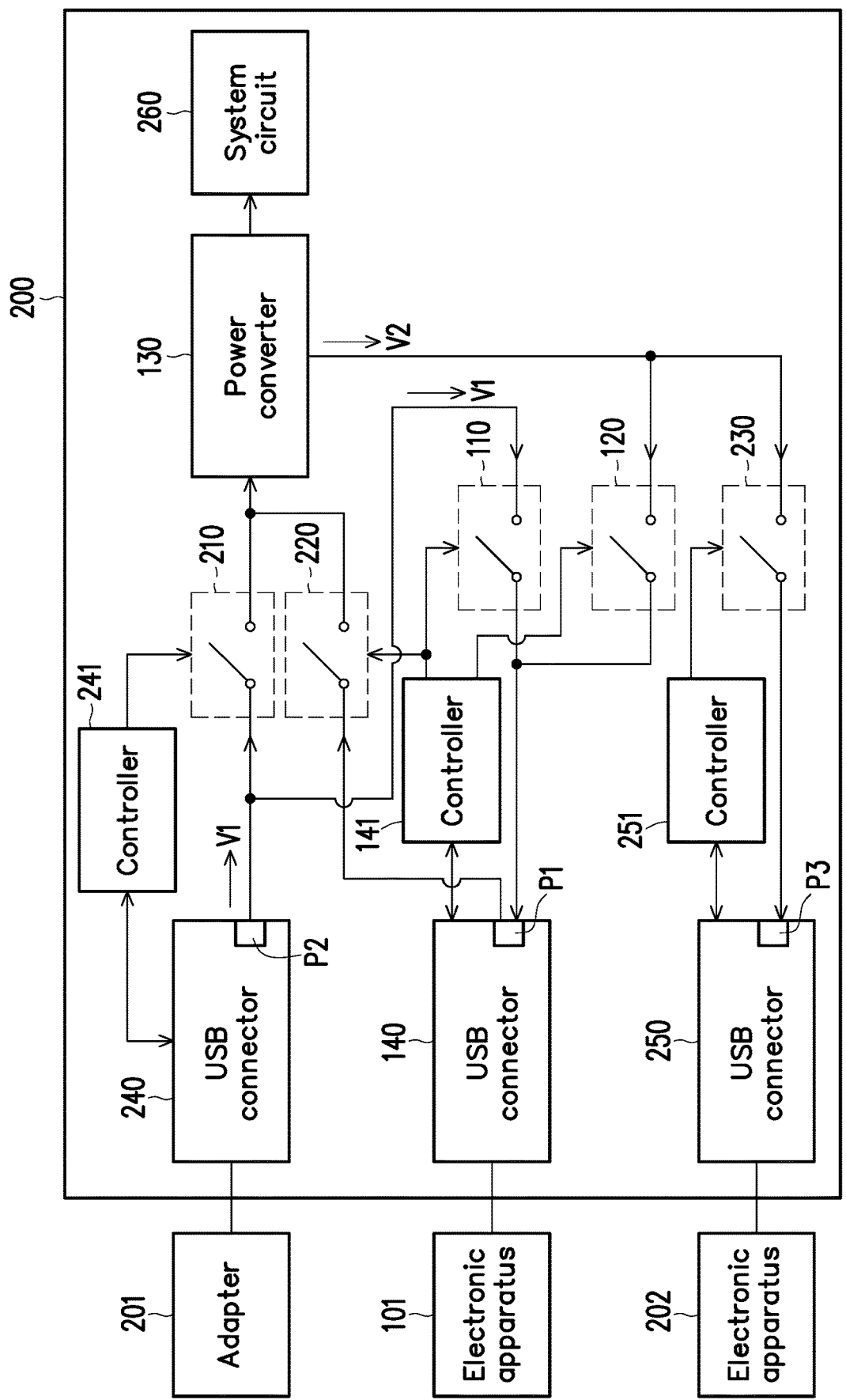
FIG. 2 is a schematic circuit block diagram of a USB device according to another embodiment of the invention.

In addition, the USB device 100 may determine a number of configurations of the USB connector according to design requirements. For example, FIG. 2 is a schematic circuit block diagram of a USB device 200 according to another embodiment of the invention. As shown in FIG. 2, the USB device 200 may include three USB connectors 140, 240, and 250. According to design requirements, the USB device 200 may be a USB hub, a USB mobile power source, or other USB devices, and the USB connectors 140, 240, and/or 250 may be a type-C universal serial bus (USB Type-C, also referred to as USB-C) connector or other USB connectors.

The USB device 200 may be connected to an external apparatus via any of the USB connectors 140, 240, and 250. The external apparatus may be an adapter 201, an electronic apparatus 101, and an electronic apparatus 202 shown in FIG. 2, and the electronic apparatus 101 and the electronic apparatus 202 may be electronic products such as a notebook computer, a tablet computer, a smart phone, and a mobile power source.

In other embodiments, the USB device 200 may also be configured with more than three USB connectors or other connectors (such as image output ports), and the USB device 200 may also be configured with different types of USB connectors. For example, the USB device 200 may be configured with both a USB type-C connector and a USB type-A connector.

Referring to FIG. 2 again, The USB device 200 further includes a controller 141, a controller 241, a controller 251, a switch 110, a switch 120, a switch 210, a switch 220, a switch 230, a power converter 130, and a system circuit 260. The controller 241 is coupled to the USB connector 240 and the switch 210, to control operation of the USB connector 240 and the switch 210. The USB connector 240 has a power pin P2. The power pin P2 is coupled to a first terminal of the switch 110 and a first terminal of the switch 210. The adapter 201 may provide the first voltage V1 to the switch 110 and the switch 210 via the USB connector 240.

A second terminal of the switch 210 is coupled to a power input terminal of the power converter 130.

When the adapter 201 is connected to the USB connector 240, the controller 241 may turn on the switch 210, to provide the first voltage V1 to the power converter 130 by the USB connector 240. A power output terminal of the power converter 130 is coupled to a first terminal of the switch 120 and a second terminal of the switch 230. The power converter 130 may convert the first voltage V1 into a second voltage V2, and the second voltage V2 is less than the first voltage V1. In the present embodiment, the first voltage V1 may be an output voltage (for example, 20V) provided by the adapter 201 to the USB connector 240, and the second voltage V2 may be a power supply voltage (for example, 5V) provided by the power converter 130 to electronic apparatuses 101, 202.

A first terminal of the switch 230 is coupled to a power pin P3 of the USB connector 250. The controller 251 is coupled to the USB connector 250 and the switch 230, to control operation of the USB connector 250 and the switch 230. For example, when the USB connector 250 is connected to the electronic apparatus 202, the controller 251 may turn on the switch 230 to output the second voltage V2 to the electronic apparatus 202 by the power converter 130.

The USB connector 140 has a power pin P1, and the power pin P1 is coupled to a second terminal of the switch 110 and a second terminal of the switch 120. The controller 141 is coupled to the USB connector 140 and switches 110, 120, and 220. When the USB connector 140 is connected to the external apparatus 101, the controller 141 may perform configuration detection on the external apparatus 101. During the configuration detection, the controller 141 may turn off the switch 110 and the switch 220 and turn on the switch 120.

For example, assuming that the USB device 200 is coupled to an external display (not shown), and the USB connector 240 of the USB device 200 is already connected to the adapter 201, the USB connector 250 of the USB device 200 is already connected to the electronic apparatus 202, and the USB connector 140 of the USB device 200 is not yet connected to the electronic apparatus 101. When the USB device 200 is applied to a high power-consumption operation (for example, the USB device 200 simultaneously charges the electronic apparatus 202, and outputs image data of the electronic apparatus 202 to the external display), if the USB connector 140 of the USB device 200 is connected to the electronic apparatus 101, the USB connector 140 needs to obtain communication power, so that the controller 141 can perform configuration detection on the electronic apparatus 101. Therefore, the controller 141 may turn off the switch 110 and the switch 220 during the configuration detection, and turn on the switch 120 during the configuration detection, so that the USB connector 140 can receive the second voltage V2 (that is, communication power) provided by the power converter 130.

During the communication (that is, during the configuration detection) between the controller 141 and the electronic apparatus 101, the controller 141 may detect a voltage demand of the electronic apparatus 101 as a configuration detection result. After the configuration detection comes to an end, during a normal operation period of the electronic apparatus 101, the controller 141 may turn off one of the switch 110 and the switch 120, and turn on the other of the switch 110 and the switch 120 according to the configuration detection result learned during the configuration detection.

For example, if the controller 141 learns, according to the configuration detection result, that the voltage demand of the electronic apparatus 101 is 5V, the controller 141 may keep the switch 110 and the switch 220 in an off state, and keep the switch 120 in an on state, to supply power to the electronic apparatus 101. In addition, assuming that the controller 141 learns, according to the configuration detection result, that the voltage demand of the electronic apparatus 101 is 20V, the controller 141 may turn on the switch 110 and turn off the switch 120 and the switch 220, to form a PD pass-through path to supply power to the electronic apparatus 101. Moreover, assuming that the controller 141 learns, according to the configuration detection result, that the adapter 201 is not connected to the USB connector 240 and the adapter 201 is connected to the USB connector 140, the controller 141 may turn on the switch 220 and turn off the switch 110 and the switch 120, to supply power to the power converter 130.

In other embodiments, the controllers 141, 241, 251 of FIG. 2 may be integrated into one control chip. When the USB device 200 is connected to the electronic apparatus 101, the controllers 141, 241, 251 in the control chip may communicate with each other to perform power supply distribution for the USB connectors 140, 240, 250 according to the voltage demand of the electronic apparatus 101. For example, when the USB device 200 is connected to the electronic apparatus 101 and the voltage demand of the electronic apparatus 101 is greater than 5V, the USB device 200 may output, through the USB connector 240 according to a result of the power supply distribution, the first voltage V1 that meets the voltage demand of the electronic apparatus 101. The controller 141 may turn on the switch 110 and turn off the switch 120 to allow the electronic apparatus 101 to receive the first voltage V1 via the power pass-through path.

According to the control manner of the switch 110 and the switch 120 as aforementioned, when the USB device 200 is connected to the electronic apparatus 101 during performing a high power-consumption operation, the USB device 200 only needs to perform switching between the switch 110 and the switch 120 to supply communication power to the electronic apparatus 101 via the power bypass path. Because the electronic apparatus 101 may obtain communication power via the power bypass path, a manner in which the communication power is supplied by lowering the output voltage of the adapter 201 (for example, lowered from 20V to 5V) is not required in the invention.

In this way, the USB device 200 in the high power-consumption state does not suffer from insufficient power supply due to a plug-in electronic apparatus 101. Meanwhile, the screen to flicker or the video playback to be interrupted issue would not happen on the electronic apparatus 202 that has been connected to the USB device 200 before the USB device 200 performs the high power-consumption operation, due to the plug-in electronic apparatus 101.

Referring to FIG. 2 again, a first power pin P1 of the first USB connector 140 is further coupled to a first terminal of the switch 220, and a second terminal of the switch 220 is coupled to a power input terminal of the power converter 130. When the USB connector 140 is connected to the electronic apparatus 101 and the USB connector 240 is not connected to the adapter 201, the controller 141 may turn on the switch 220 to transmit power to the power converter 130 by the electronic apparatus 101. The power converter 130 may supply power to a system circuit 260 of the USB device 200. According to design requirements, the system circuit may be a circuit that is in the USB device 200 and that is used to perform a particular function, such as a central processing unit (CPU), a chip set, a memory, and the like.

Figure 3:
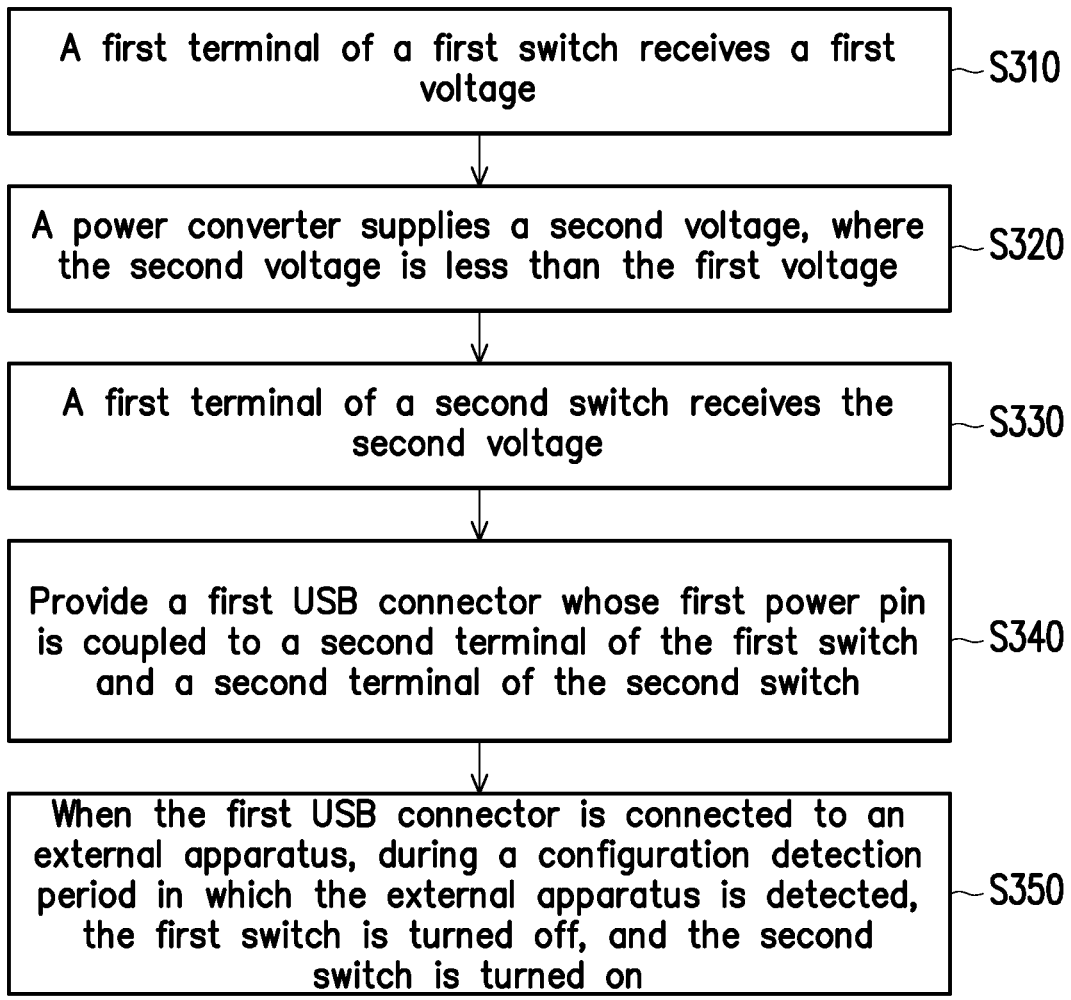
FIG. 3 is a schematic flowchart of an operation method of a USB device according to an embodiment of the invention.

FIG. 3 is a schematic flowchart of an operation method of a USB device 200 according to an embodiment of the invention. Referring to FIG. 2 and FIG. 3, when a USB connector 240 is connected to an adapter 201, a first terminal of a switch 110 may receive, in step S310, a first voltage V1 provided by the USB connector 240. In step S320, a power converter 130 may provide a second voltage V2, where the second voltage V2 is less than the first voltage V1. In step S330, a first terminal of a switch 120 may receive a second voltage V2 provided by the power converter 130. In step S340, the USB device 200 may provide a USB connector 140 (that is, a first USB connector), where a first power pin P1 of the USB connector 140 is coupled to a second terminal of the switch 110 and a second terminal of the switch 120. In step S350, when the USB connector 140 (that is, the first USB connector) is connected to an external apparatus (for example, an electronic apparatus 101), during a configuration detection period in which the external apparatus is detected, the controller 141 may turn off the switch 110 and turn on the switch 120. For the detailed operation mode of the switch 110 and the switch 120, reference may be made to related descriptions of the embodiments of FIG. 1 and FIG. 2, and the descriptions thereof are omitted herein.

Based on the above, in the embodiments of the invention, the USB device may provide the PD pass-through path or the power bypass path of the USB device by controlling conducting states of the first switch and the second switch. Therefore, when the first USB connector of the USB device is connected to the external apparatus, the external apparatus may obtain, via the power bypass path, power for communicating with the USB device. In this way, when the USB device operates in a high power-consumption state (for example, the USB device simultaneously performs image output and data access), the USB device does not suffer from insufficient power supply due to reconnection to another external apparatus.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An USB device, comprising:
   a first switch having a first terminal configured to receive a first voltage;
   a power converter configured to provide a second voltage, wherein the second voltage is less than the first voltage;
   a second switch having a first ten al coupled to the power converter to receive the second voltage; and
   a first USB connector having a first power pin coupled to a second terminal of the first switch and a second terminal of the second switch, wherein the second switch is disposed on a power supply path through which the first USB connector receives configuration communication power,
   wherein when the first USB connector is connected to an external apparatus, the first switch and the second switch are controlled by both turning off the first switch and turning on the second switch during a configuration detection period of the external apparatus.

2. The USB device according to claim 1, wherein
   during a normal operation period after the end of the configuration detection period for the external apparatus, according to a configuration result of the configuration detection period, one of the first switch and the second switch is turned off and the other of the first switch and the second switch is turned on.

3. The USB device according to claim 1, wherein the power converter is configured to convert the first voltage to the second voltage.

4. The USB device according to claim 1, further comprising:
   a second USB connector having a second power pin coupled to the first terminal of the first switch to provide the first voltage; and
   a third switch having a first terminal coupled to the second power pin of the second USB connector to receive the first voltage, wherein a second terminal of the third switch is coupled to a power input terminal of the power converter to provide the first voltage.

5. The USB device according to claim 1, further comprising:
   a third switch having a first terminal coupled to the first power pin of the first USB connector, wherein a second terminal of the third switch is coupled to a power input terminal of the power converter.

6. The USB device according to claim 1, further comprising:
   a second USB connector; and
   a third switch having a first terminal coupled to a second power pin of the second USB connector, wherein a second terminal of the third switch is coupled to a power output terminal of the power converter to receive the second voltage.

7. The USB device according to claim 1, wherein the power converter is configured to supply power to a system circuit of the USB device.

8. An operation method of an USB device, comprising:
   receiving a first voltage by a first terminal of a first switch;
   providing a second voltage by a power converter, wherein the second voltage is less than the first voltage;
   receiving the second voltage by a first terminal of a second switch;
   providing a first USB connector, wherein a first power pin of the first USB connector is coupled to a second terminal of the first switch and a second terminal of the second switch, wherein the second switch is disposed on a power supply path through which the first USB connector receives configuration communication power; and
   when the first USB connector is connected to an external apparatus, during controlling the first switch and the second switch by both turning off the first switch and turning on the second switch during a configuration detection period of the external apparatus.

9. The operation method according to claim 8, further comprising:
   during a normal operation period after the end of the configuration detection period for the external apparatus, according to a configuration result of the configuration detection period, turning off one of the first switch and the second switch and turning on the other of the first switch and the second switch.

10. The operation method according to claim 8, wherein the power converter is configured to convert the first voltage to the second voltage.

11. The operation method according to claim 8, further comprising:
    providing the first voltage to the first terminal of the first switch by a second power pin of a second USB connector;
    receiving, by a first terminal of a third switch, the first voltage from the second power pin of the second USB connector; and
    providing the first voltage to a power input terminal of the power converter by a second terminal of the third switch.

12. The operation method according to claim 8, further comprising:
    providing a third switch, wherein a first terminal of the third switch is coupled to the first power pin of the first USB connector, and a second terminal of the third switch is coupled to a power input terminal of the power converter.

13. The operation method according to claim 8, further comprising:
    providing a second USB connector; and
    providing a third switch, wherein a first terminal of the third switch is coupled to a second power pin of the second USB connector, and a second terminal of the third switch is coupled to a power output terminal of the power converter to receive the second voltage.

14. The operation method according to claim 8, further comprising:
    supplying power to a system circuit of the USB device by the power converter.

* * * * *